United States Patent
Chandrasekar et al.

(10) Patent No.: US 8,285,706 B2
(45) Date of Patent: Oct. 9, 2012

(54) USING A HUMAN COMPUTATION GAME TO IMPROVE SEARCH ENGINE PERFORMANCE

(75) Inventors: Raman Chandrasekar, Seattle, WA (US); Christopher Brian Quirk, Seattle, WA (US); Sarthak Deepak Shah, Kirkland, WA (US); Matthew Richardson, Seattle, WA (US); Christopher John Champness Burges, Bellevue, WA (US); Abhishek Gupta, Atlanta, GA (US); Hao Ma, Shatin (HK)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 12/481,595

(22) Filed: Jun. 10, 2009

(65) Prior Publication Data
US 2010/0317444 A1 Dec. 16, 2010

(51) Int. Cl.
*G06F 7/00* (2006.01)
*G06F 17/00* (2006.01)
(52) U.S. Cl. .................. 707/711; 707/709; 707/710
(58) Field of Classification Search .......... None
See application file for complete search history.

(56) References Cited

U.S. PATENT DOCUMENTS

| | | | | |
|---|---|---|---|---|
| 4,884,816 A * | 12/1989 | Ford et al. | ...... | 273/240 |
| 6,920,426 B2 * | 7/2005 | Takechi | ...... | 705/346 |
| 7,403,910 B1 * | 7/2008 | Hastings et al. | ...... | 705/26.1 |
| 7,412,385 B2 * | 8/2008 | Brockett et al. | ...... | 704/245 |
| 2002/0087400 A1 * | 7/2002 | Khoo et al. | ...... | 705/14 |
| 2004/0169678 A1 * | 9/2004 | Oliver | ...... | 345/738 |
| 2005/0102614 A1 * | 5/2005 | Brockett et al. | ...... | 715/513 |
| 2005/0125307 A1 * | 6/2005 | Hunt et al. | ...... | 705/26 |
| 2006/0179053 A1 | 8/2006 | von Ahn Arellano et al. | | |
| 2007/0072672 A1 * | 3/2007 | Moreno | ...... | 463/25 |
| 2008/0027925 A1 * | 1/2008 | Li et al. | ...... | 707/5 |
| 2008/0065468 A1 * | 3/2008 | Berg et al. | ...... | 705/10 |
| 2008/0113801 A1 * | 5/2008 | Moreno | ...... | 463/40 |
| 2008/0235575 A1 * | 9/2008 | Weiss | ...... | 715/255 |
| 2009/0227305 A1 * | 9/2009 | Moreno | ...... | 463/9 |

OTHER PUBLICATIONS

Granka et al. "Eye-Tracking Analysis of User Behavior in WWW Search", ACM, Jul. 25-29, 2004.*
"Online Game Feeds Music Search Engine Project at UC San Diego", retrieved at <<http://www.huliq.com/35824/online-game-feeds-music-search-engine-project-at-uc-san-diego>>, Apr. 17, 2009, pp. 3.
Law, et al., "Input-Agreement: A New Mechanism for Collecting Data Using Human Computation Games", retrieved at http://www.cs.cmu.edu/~elaw/papers/tagatune.pdf>>, pp. 1-10.
Law, et al., "Intentions: A Game for Classifying Search Query Intent", retrieved at <<http://www.cs.cmu.edu/~elaw/papers/intentions.pdf>>, pp. 1-6.
"We Make Games with a Purpose", retrieved at <<http://www.gwap.com/gwap/about/>>, Apr. 17, 2009, p. 1.

(Continued)

*Primary Examiner* — Fred I Ehichioya
*Assistant Examiner* — Garrett Smith
(74) *Attorney, Agent, or Firm* — Hope Baldauff Hartman, LLC

(57) ABSTRACT

Human computation games are provided wherein a player is shown a page, such as a web page. The player is then asked to provide one or more terms that are intended to cause a search engine to return the page in response to performing a query using the terms. The terms provided by the player during game play are then collected, stored, and utilized to improve the performance of the search engine.

20 Claims, 8 Drawing Sheets

OTHER PUBLICATIONS

Siorpaes, et al., "Games with a Purpose for the Semantic Web", retrieved at <<http://www.computer.org/portal/cms_docs_intelligent/intelligent/homepage/2008/X3-08/x3sio.pdf>>, pp. 11.

"For Certain Tasks, the Cortex Still Beats the CPU", retrieved at<<http://www.wired.com/techbiz/it/magazine/15-07/ff_humancomp>>, Apr. 17, 2009, pp. 2.

Uzwyshyn, Ray, "Arbitrage Opportunities for Image Search: Changing Metaphors, Game Metadata and Gathering Common Sense" retrieved at <<http://library.uwf.edu/about/automation/ImageSearchDirections.pdf>> pp. 7.

Lydiabily, "How to Play Games Online to Improve Search Engines", retrieved at http://www.ehow.com/how_4605585_games-online-improve-search-engines.html>> Apr. 17, 2009, pp. 2.

Lee, et al., "Automatic Identification of User Goals in Web Search", retrieved at <<http://www2005.org/cdrom/docs/p391.pdf>>, pp. 10.

Bennett, et al., "Learning Consensus Opinion: Mining Data from a Labeling Game", retrieved at <<http://research.microsoft.com/en-us/um/people/pauben/papers/www-2009-learning-consensus.pdf>>, pp. 10.

Brown, et al., "The Mathematics of Statistical Machine Translation: Parameter Estimation" Retrieved at <<http://www.ldc.upenn.edu/acl/J/J93/J93-2003.pdf>>, pp. 1-50.

Dempster,et al., "Maximum Likelihood from Incomplete Data via the EM Algorithm", retrieved at <<http://web.mit.edu/6.435/www/Dempster77.pdf>>, Apr. 6, 2007, pp. 1-39.

Ford, et al., "Information Seeking and Mediated Searching. Part 4. Cognitive Styles in Information Seeking" retrieved at <<http://sky.fit.qut.edu.au/~spinkah/eprints/JASIST-Part4.pdf>>, pp. 1-8.

Koehn, et al. "Statistical Phrase-Based Translation", retrieved at <<http://portal.acm.org/ft_gateway.cfm?id=1073462&type=pdf&coll=GUIDE&dl=GUIDE&CFID=31568678&CFTOKEN=82228647>>, pp. 1-7.

Law, et al. "Tagatune: A Game for Music and Sound Annotation", retrieved at <<http://www.cs.cmu.edu/~elaw/papers/ISMIR2007.pdf>>, pp. 4.

"NIST 2008 Machine Translation Evaluation" retrieved at <<http://www.nist.gov/speech/tests/mt/2008/doc/mt08_official_results_v0.html>>, Jun. 6, 2006, pp. 1-10.

Paek, et al."People Watcher: A Game for Eliciting Human-Transcribed Data for Automated Directory Assistance" retrieved at <<http://research.microsoft.com/en-us/um/people/timpaek/papers/timpaek_interspeech07.pdf>>, pp. 1-4.

Quirk, et al."Monolingual Machine Translation for Paraphrase Generation" retrieved at <<http://www.mt-archive.info/EMNLP-2004-Quirk.pdf>>, pp. 1-8.

Vogel, et al., "HMM-based Word Alignment in Statistical Translation" retrieved at <<http://acl.ldc.upenn.edu/C/C96/C96-2141.pdf>>, pp. 1-6.

Ahn, Luis Von, "Games with a Purpose", retrieved at <<http://www.cs.cmu.edu/~biglou/ieee-gwap.pdf>>, pp. 1-3.

Ahn, et al., "Labeling Images with a Computer Game", retrieved at <<http://www.cs.cmu.edu/~biglou/ESP.pdf>>, pp. 8.

Ahn, et al., "Designing Games with a Purpose", retrieved at <<http://www.cs.cmu.edu/~biglou/GWAP_CACM.pdf>>, pp. 1-10.

Ahn, et al., "Improving Image Search with Phetch", retrieved at <<http://ieeexplore.ieee.org/Xplore/login.jsp?url=http%3A%2F%2Fieeexplore.ieee.org%2Fstamp%2Fstamp.jsp%3Ftp%3D%26isnumber%3D4218011%26arnumber%3D4218324&authDecision=-203>>, pp. 1-10.

Ahn, et al. "Improving Accessibility of the Web with a Computer Game", retrieved at <<http://www.cs.cmu.edu/~biglou/Phetch.pdf>>, pp. 1-4.

Ahn, et al., "Verbosity: A Game for Collecting Common-Sense Facts", retrieved at <<http://www.cs.cmu.edu/~biglou/Verbosity.pdf>> pp. 1-4.

Ahn, et al., "Peekaboom: A Game for Locating Objects in Images", retrieved at <<http://www.cs.cmu.edu/~biglou/Peekaboom.pdf>>, pp. 1-10.

Weber, et al., "Rethinking the ESP Game" retrieved at <<ftp://ftp.research.microsoft.com/pub/tr/TR-2008-132.pdf>>, pp. 1-11.

Edery et al., *Changing the Game: How Video Games are Transforming the Future of Business*. FT Press. Oct. 17, 2008. Abstract only.

Law et al., "Intentions: A Game for Classifying Search Query Intent," Apr. 2009, *Proceedings of the 27th International Conference Extended Abstracts on Human Factors in Computing Systems*, 6 pages.

Malone, "Heuristics for Designing Enjoyable User Interfaces: Lessons from Computer Games," 1982, *Proceedings of the 1982 Conference on Human Factors in Computing Systems*, 6 pages.

Malone, "What Makes Things Fun to Learn? Heuristics for Designing Instructional Computer Games," 1980, *Proceedings of the 3rd ACM SIGSMALL Symposium and the 1st SIGPC Symposium on Small Systems*, 8 pages.

McDonald. *The Practical Guide to Defect Prevention*. Microsoft Press. 2007. Abstract only.

Law, et al., "Input-Agreement: A New Mechanism for Collecting Data Using Human Computation Games", 2009, Proc. of the 27th Int'l Conf. on Human Factors in Computing Sys., retrieved at http://www.cs.cmu.edu/-elaw/papers/tagatune.pdf, pp. 1-10.

Law, et al., "Intentions: A Game for Classifying Search Query Intent", 2009, Proc. of the 27th Int'l Conf. on Human Factors in Computing Sys., retrieved at http://www.cs.cmu.edu/-elaw/papers/intentions.pdf, pp. 1-6.

Siorpaes, et al., "Games with a Purpose for the Semantic Web", May-Jun. 2008, IEEE Intelligent Systems, retrieved at http://www.computer.org/portal/cms_docs_intelligentlintelligenUhomepage/2008/X3-08/x3sio.pdf, pp. 11.

Uzwyshyn, Ray, "Arbitrage Opportunities for Image Search: Changing Metaphors, Game Metadata and Gathering Common Sense" retrieved Apr. 17, 2009, at http://library.uwf.edu/aboutlautomation/ImageSearchDirections.pdf pp. 7.

Lee, et al., "Automatic Identification of User Goals in Web Search", 2005, Proc. of the 14th Int'l Con. On World Wide Web, retrieved at http://www2005.org/cdrom/docs/ p391.pdf, pp. 10.

Bennett, et al., "Learning Consensus Opinion: Mining Data from a Labeling Game", 2009, Proc. of the 18th Int'l Con on World Wide Web, retrieved at http://research. microsoft.com/en-us/um/people/pauben/papers/www-2009-learning-consensus. pdf, pp. 1O.

Brown, et al., "The Mathematics of Statistical Machine Translation: Parameter Estimation" 1993, J. Computational Linguistics—Special issue of using large corpora: II, vol. 19(2), Retrieved at <<http://www.ldc.upenn.edu/acl/J/J93/J93-2003.pdf>>, pp. 1-50.

Ford, et al., "Information Seeking and Mediated Searching Part 4. Cognitive Styles in Information Seeking" Aug. 2002, J. of the Amer. Soc. For Information Science and Technology, vol. 53(9), retrieved at http://skyJit.qut.edu.au/-spinkah/eprints/JASIST-Part4.pdf, pp. 1-8.

Koehn, et al. "Statistical Phrase-Based Translation", 2003, Conf. of the North American Chapter of the Assoc. for Computational Linguistics on Human Language Technology—vol. 1, retrieved at http://portal.acm.orglft_gateway.cfm?id=1073462&type=pdf&coll=GUIDE&dl=GUIDE&CFID=31568678&CFTOKEN=82228647, pp. 1-7.

Law, et al. "Tagatune: A Game for Music and Sound Annotation", 2007 retrieved at http://www.cs.cmu.edu/-elaw/papers/ISMIR2007.pdf, pp. 4.

Paek, et al. "People Watcher: A Game for Eliciting Human-Transcribed Data for Automated Directory Assistance" 2007, Proc. of Interspeech, retrieved at http://research.microsoft.com/en-us/um/people/timpaek/papers/timpaekinterspeech07.pdf, pp. 1-4.

Quirk, et al. "Monolingual Machine Translation for Paraphrase Generation" 2004, Proceedings of the 12004 Conference on Empirical Methods in Natural Language Processing, retrieved at http://www.mt-archive.info/EMNLP-2004-Quirk.pdf, pp. 1-8.

Vogel, et al., "HMM-based Word Alignment in Statistical Translation" 1996, Proceedings of the 16th Conference on Computational Linguistics, vol. 2, retrieved at http://acl.ldc.upenn.edu/C/C96/C96-2141.pdf, pp. 1-6.

Ahn, Luis Von, "Games with a Purpose", Jun. 2006, retrieved at http://www.cs.cmu.edu/-bigiou/ieee-gwap.pdf, *Computer*, 39(6):92-94.

Ahn, et al., "Designing Games with a Purpose", Aug. 2008, Communications of the ACM, vol. 51(8), retrieved at http://www.cs.cmu.edu/-biglou/GWAP_CACM.pdf, pp. 1-10.

Ahn, et al., "Improving Image Search with Phetch", Apr. 15-20, 2007, IEEE International Conference on Acoustics, Speech, and Signal Processing, pp. 1-10.

Ahn, et al. "Improving Accessibility of the Web with a Computer Game", 2006, Proceedings of SIGCHI Conference on Human Factors in Computing Systems, retrieved at <<http://www.cs.cmu.edu/-biglou/Phetch.pdf>>, pp. 1-4.

Ahn, et al., "Verbosity: A Game for Collecting Common-Sense Facts", 2006, Proceedings of SIGCHI Conference on Human Factors in Computing Systems, retrieved at http://www.cs.cmu.edu/-biglou/Verbosity.pdf, pp. 1-4.

Ahn, et al., "Peekaboom: A Game for Locating Objects in Images", 2006, Proceedings of SIGCHI Conference on Human Factors in Computing Systems, retrieved at http://www.cs.cmu.edu/-biglou/Peekaboom.pdf, pp. 1-10.

Weber, et al., "Rethinking the ESP Game" 2008, retrieved at ftp://ftp.research.microsoft.com/pub/trITR-2008-132.pdf, pp. 1-11.

* cited by examiner

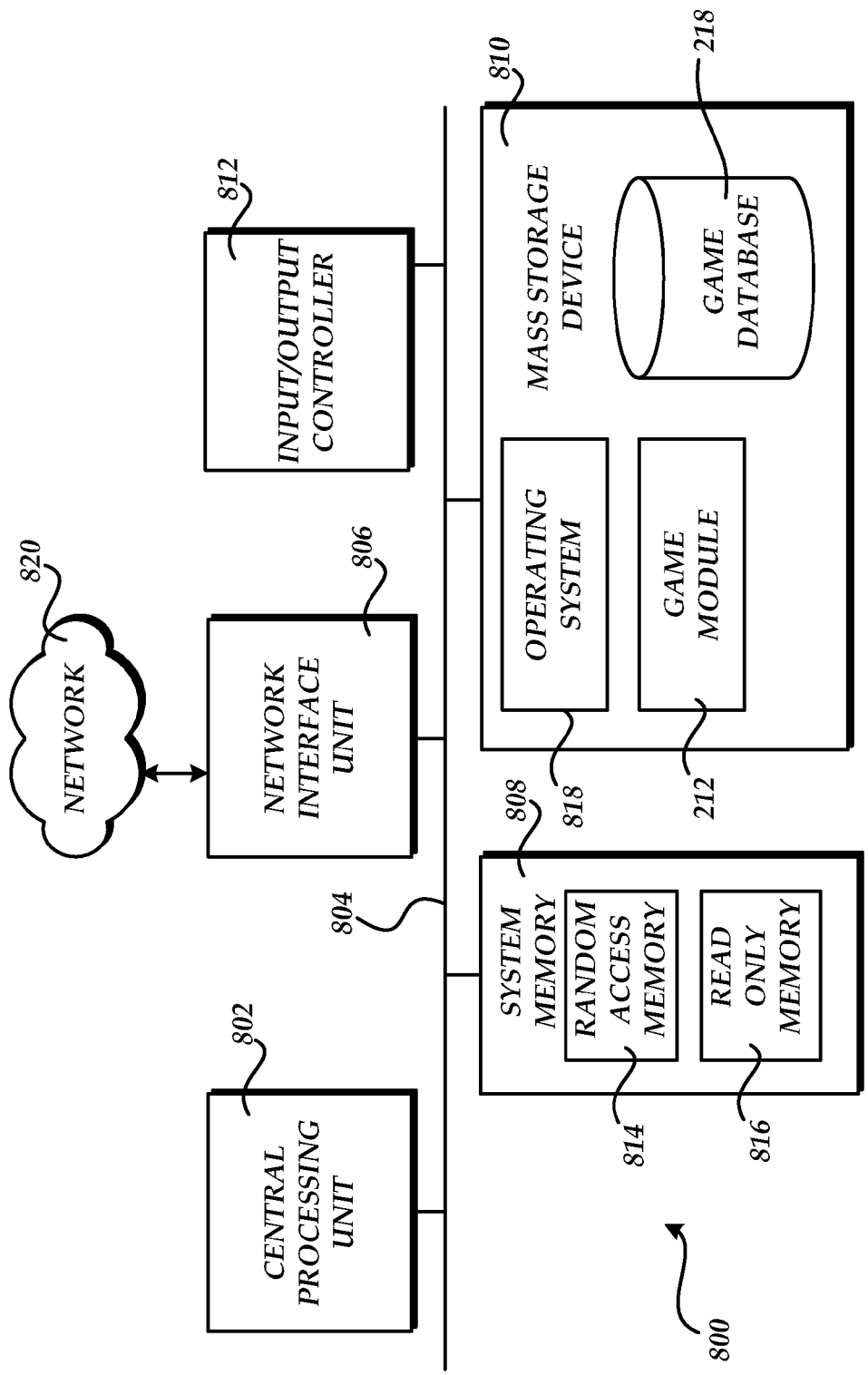

USING A HUMAN COMPUTATION GAME TO IMPROVE SEARCH ENGINE PERFORMANCE

BACKGROUND

Mechanisms utilized today to evaluate and improve the performance of search results are typically based on generating a mapping from queries to pages. For instance, one mechanism utilizes humans to measure the relevance of search results returned by a particular query. Such human relevance judgment methods, however, are mainly useful for evaluating small sets of search results and do not scale well for evaluating the performance of a search engine over a large evaluation corpora.

Another mechanism utilized to evaluate and improve the performance of search engines uses implicit measures of relevance, such as identifying clicks on search results. This mechanism is only effective, however, for pages surfaced by the search engine being evaluated. Some pages might not be surfaced by a search engine for a variety of reasons, including bad ranking, indexing problems, network issues, and others.

Consequently, if a page does not get surfaced or is not surfaced with a high enough rank, the page might never be made available for a human relevance judgment, nor will the page be made available to be clicked upon.

It is with respect to these and other considerations that the disclosure made herein is presented.

SUMMARY

Concepts and technologies are described herein for utilizing human computation games to improve search engine performance. Generally, human computation games harness the time and energy that people spend on playing games to solve computational problems that are otherwise difficult to tackle. Through an implementation of the concepts and technologies presented herein, the performance of a search engine can be evaluated and improved through the use of human computation games that generate a mapping from pages to queries rather than by generating a mapping from queries to pages as in previous solutions. Through the use of the games presented herein, the performance of a search engine can be evaluated and improved even with respect to pages that are not generally surfaced by the search engine or are not surfaced with a high enough rank to be evaluated using previous solutions.

According to one embodiment, a game is provided wherein a player of the game is shown a page, such as a World Wide Web ("web") page. The player is then asked to provide one or more terms (which might also be referred to herein as search terms, query terms, a query, a label, or tags) that are likely to cause a search engine to return the page in response to performing a query using the terms. The terms provided by the player during play of the game are then collected, stored, and utilized to improve the performance of the search engine.

According to one aspect presented herein, the game is a single player human computation game. In the single player game, a page is displayed to the player and terms are received from the player. A search engine then uses the terms to perform a query and search results are received from the search engine. A determination is then made as to whether the page displayed to the player is included in the results received from the search engine. Points are assigned to the player if the web page displayed to the player is included in the results returned by the search engine. In one embodiment, points are assigned to the player when the page is in the top N search results, where N represents a pre-defined integer value. This process may be repeated for a pre-defined time period or a pre-defined number of pages.

According to another aspect, the game is a multi-player human computation game. In one implementation, a page is displayed to two or more players. Terms are received from the players individually and a search engine performs queries using the terms. Points are assigned to the player that first provides terms which, when used by the search engine to perform a query, causes the search engine to return results that include the page. In one embodiment, points are assigned to the first player that provides terms that cause the search engine to return search results that include the page in the top N search results, where N represents a pre-defined integer value. This process may be repeated for a pre-defined time period or a pre-defined number of pages.

According to another multi-player implementation, the same or a similar page is displayed to two players. Terms are received from the players, a search engine performs queries using the terms, and search results are received from the search engine. The results are then displayed to the players. Each player is then queried as to whether they believe they are viewing the same or a different page as the other player. Points are assigned to both players when both players correctly indicate that they are viewing the same or a different page as the other player.

According to other aspects, terms collected and stored during game play are utilized to evaluate and improve the performance of a search engine and pages indexed by the search engine. According to various implementations, this might include utilizing the terms to identify query alterations for use by the search engine, utilizing the terms to provide metadata for pages, utilizing the terms to identify the structure of queries, performing a cognitive analysis on the terms to identify searching behavior, performing the equivalent of an eye-tracking analysis on the pages, and utilizing the terms to identify ranking issues with pages. Other types of analysis might also be performed on the terms to improve the performance of the search engine and the pages.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a computer architecture diagram showing an illustrative computer hardware and software architecture for a computing system capable of implementing aspects of the embodiments presented herein.

DETAILED DESCRIPTION

Figure 1:
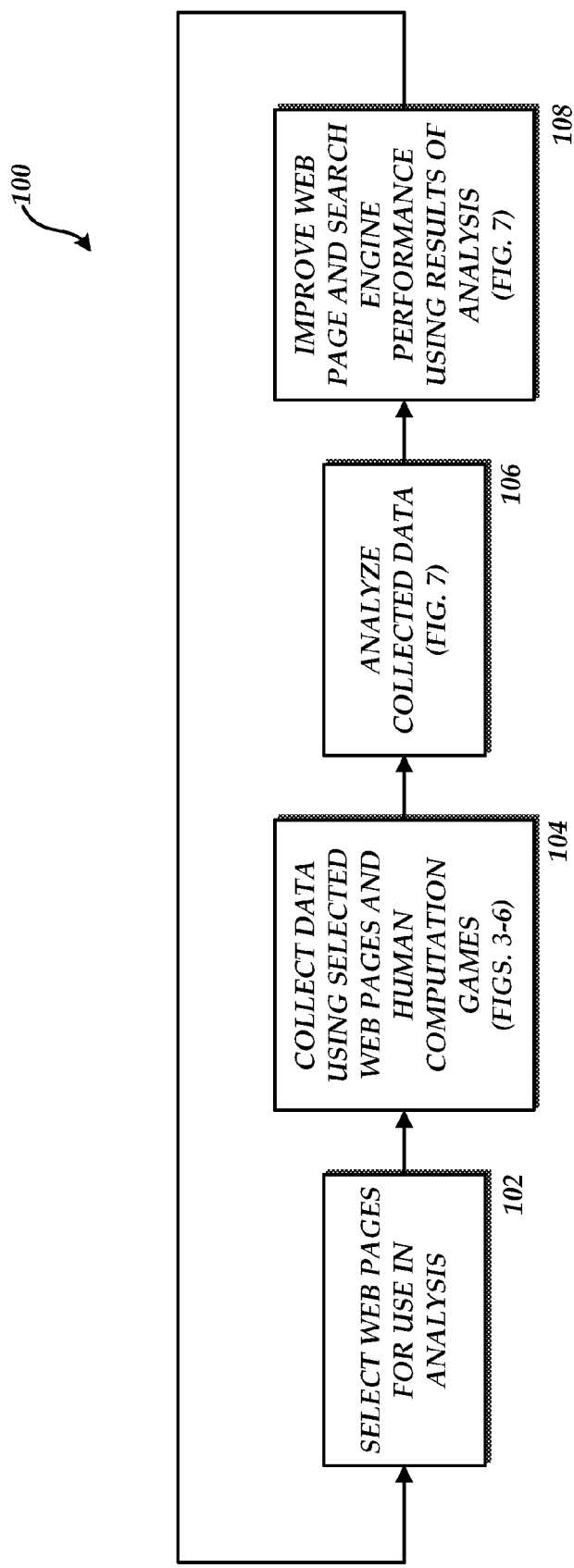
FIG. 1 is a flow diagram illustrating aspects of one process presented here for utilizing human computation games to improve search engine performance.

The following detailed description is directed to technologies for utilizing human computation games to improve search engine performance. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for utilizing human computation games to improve search engine performance will be presented.

Turning now to FIG. 1, a flow diagram will be described that illustrates one process 100 presented herein for utilizing human computation games to improve the performance of a search engine. The process 100 begins at operation 102 where one or more pages are selected for use in the analysis presented herein. As described above, the embodiments presented herein operate in conjunction with one or more search engines that are configured to provide functionality for searching pages, such as web pages. It should be appreciated that the embodiments presented herein may be utilized with other types of documents indexable and searchable by a search engine. For instance, the embodiments presented herein may be utilized by search engines capable of indexing and searching virtually any type of content including, but not limited to, word processing documents, spreadsheet documents, text documents, presentation documents, and others. Accordingly, although the embodiments presented herein are described in the context of web pages, it should be appreciated that the embodiments presented herein are not limited to an implementation configured for searching web pages available on the Internet or other type of network.

According to embodiments, the manner in which pages are chosen might assist in identifying issues that prevent a page from being surfaced in a search result. For instance, in one embodiment web pages are chosen for use in the analysis presented herein that appear in the search results provided by some search engines but not by others. Alternatively, web pages may be chosen for use in the analysis presented herein that tend to include more image data than textual data. When there is textual data, it is relatively easy for a search engine to index and search based upon that text. If a page is mostly images, however, it may be helpful to elicit additional metadata through the processes described herein.

In another implementation, the web pages may be selected for use in the analysis based on their relationship to the content contained therein. For instance, pages related to weather, sports, or other particular topics may be utilized to elicit player's queries. For instance, it may be inferred from pages containing weather data that players search more frequently for "weather, city name" or "weather, zip code". Alternatively, it might be determined that players sometimes search for "weather, city name, state" or "weather, city name, country". As will be described in greater detail below, such an analysis can improve the performance of search engines by configuring the search engines to understand the format of particular queries. Additionally, grouping related pages might also provide more interesting game play to players by providing only pages in a particular topic area selected by the player.

According to another embodiment, the pages selected for use in the analysis described herein might be pages that do not show up in search results provided by a search engine. By using pages that do not show up in search results the games presented herein can be utilized to identify queries that lead to these pages. The identified queries can then be utilized to determine why the pages do not show up in search results.

According to other embodiments, the pages selected for use in the analysis described herein can be adaptively chosen to keep players engaged in the human computation games described below. For instance, if a player is encountering difficulty in generating keywords corresponding to a page, pages may be provided in subsequent game sessions that other players have easily identified. Similarly, if a player finds particular pages too easy to identify, pages that other players have found to be more difficult to identify may be presented. It should be appreciated that other mechanisms may be utilized for selecting the web pages that are to be used in the analysis described below.

Once the pages for use in the analysis described herein have been selected at operation 102, the process 100 proceeds to operation 104. At operation 104, data is collected using the pages selected at operation 102 and one or more of several human computation games described herein. As will be discussed in greater detail below, several human computation games are described herein whereby a mapping from pages to queries can be generated. In particular, in each of the games described herein a player of the game is shown one of the pages selected at operation 102. The player is then asked to provide one or more terms that are likely to cause a search engine to return the page in response to performing a query using the terms. The terms provided by the player during play of the game are then collected, stored, and utilized to improve the performance of the search engine.

It should be appreciated that, according to embodiments, the games presented herein are configured to collect additional information during game play. For instance, in embodiments, the games might collect demographic information regarding a player, data identifying a player's physical location, and other types of data. As will be described in greater detail below, this information might be utilized to improve the performance of a search engine. For example, an analysis might be performed to identify how people having varying demographics tend to search for the same page. This information can then be utilized to modify the operation of the search engine appropriately.

Figure 3:
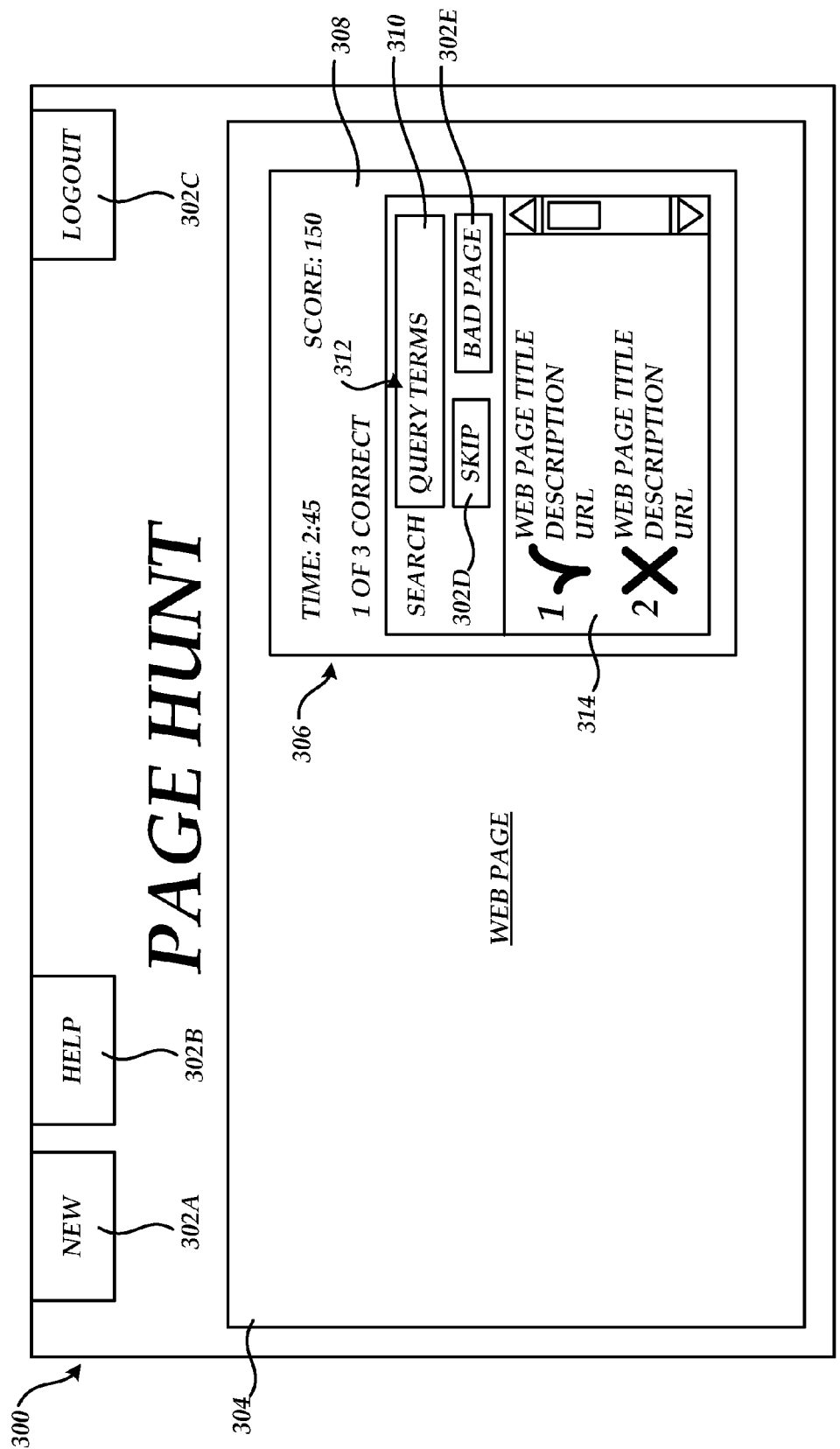
FIG. 3 is a user interface diagram showing aspects of a user interface generated by a human computation game in one embodiment presented herein.
Figure 5:
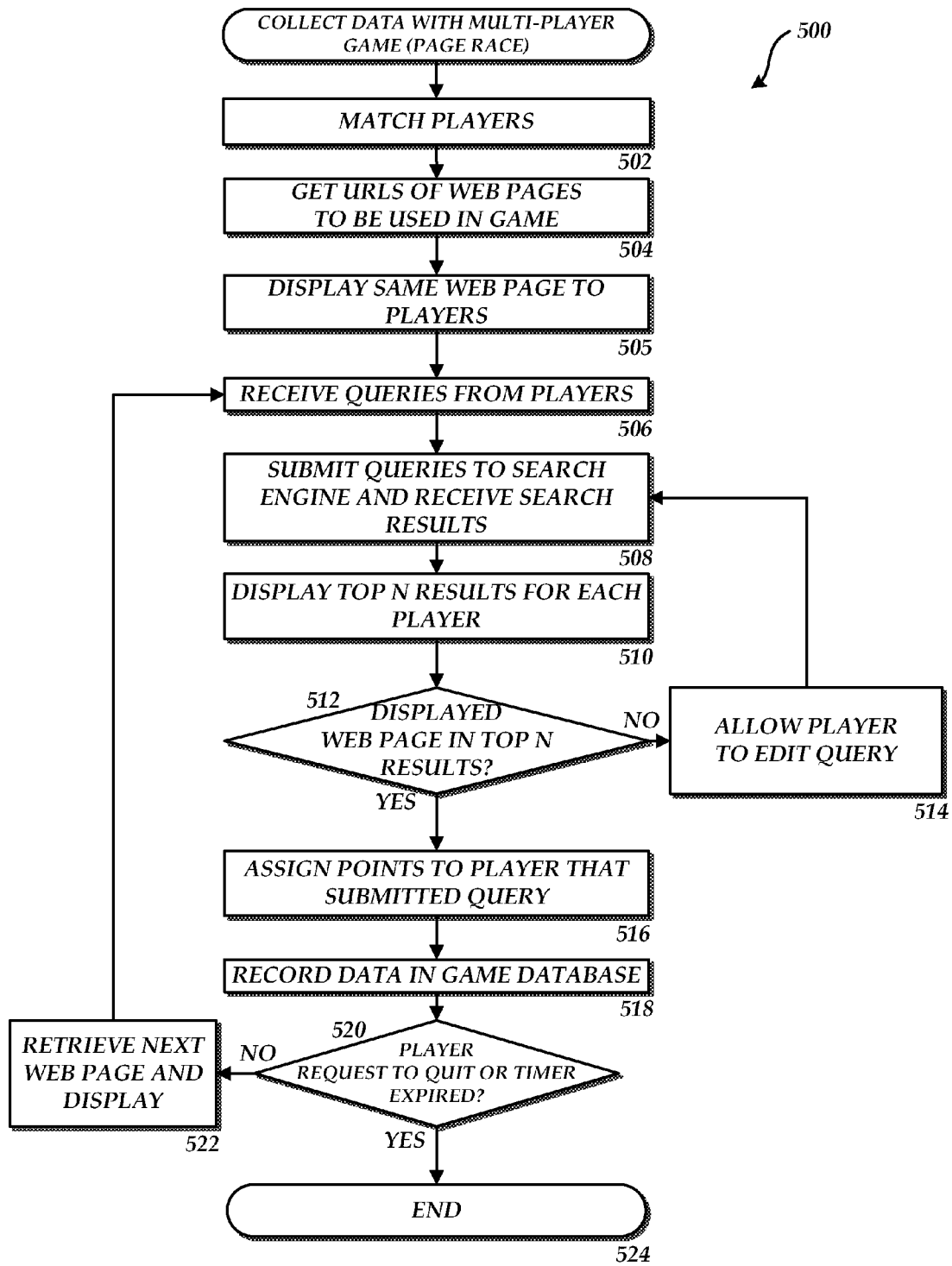
Figure 6:
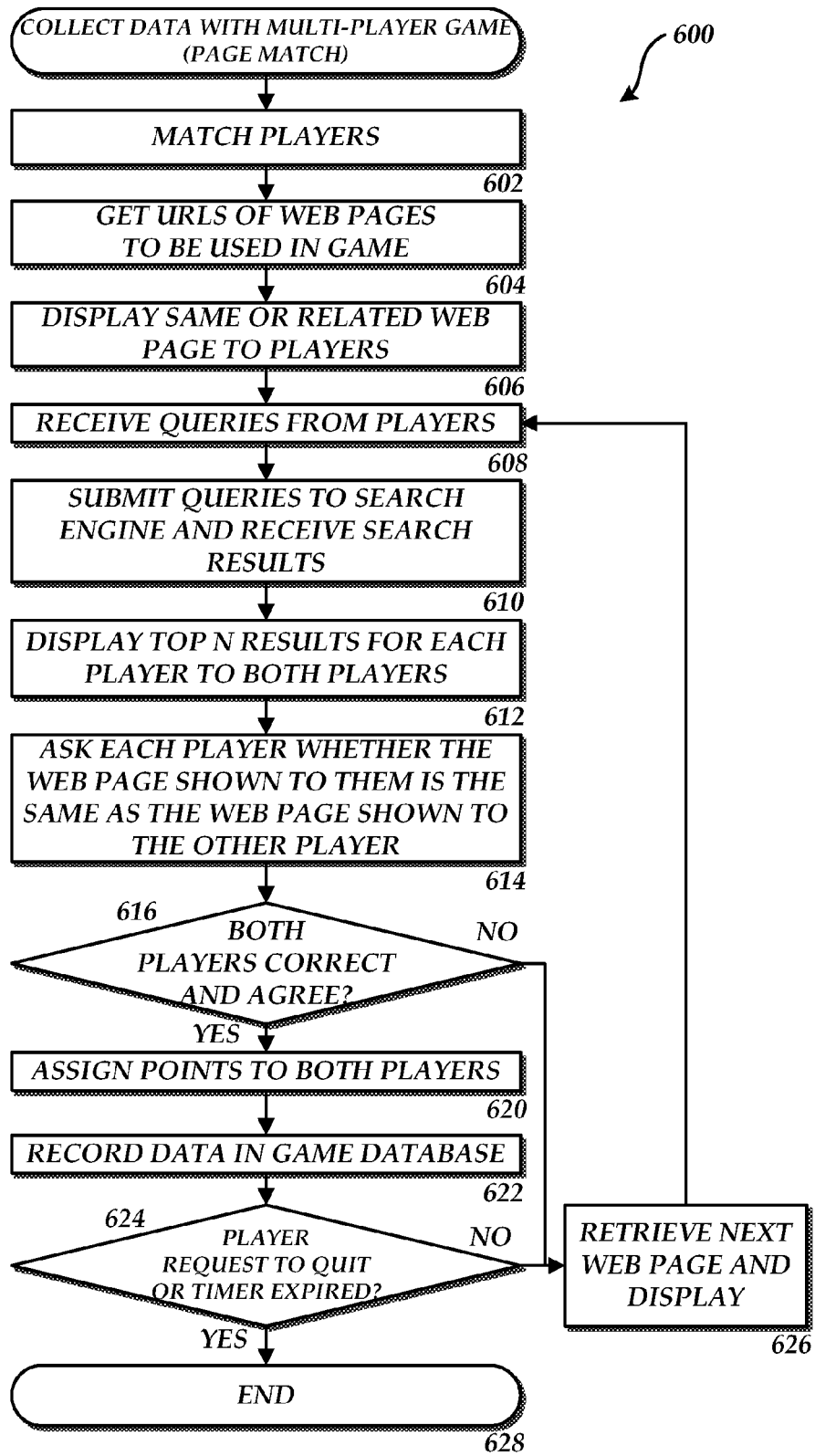

Additional details regarding the operation of the human computation games presented herein are provided below with reference to FIGS. 3-6. In particular, FIG. 3 illustrates a single player human computation game, which may be referred to herein as "Page Hunt". FIG. 5 illustrates a multi-player human computation game, which might be referred to herein as "Page Race". FIG. 6 illustrates the operation of a multi-player human computation game, which may be referred to herein as "Page Match". Additional details regarding the operation of the human computation games presented herein will be presented below with reference to FIGS. 3-6.

From operation 104, the process 100 proceeds to operation 106. At operation 106, the data collected through the use of the human computation games presented herein is analyzed. Once the data has been analyzed, the process 100 proceeds to operation 108 where the performance of the search engine, and potentially the pages themselves, is improved utilizing the results of the analysis performed at operation 106. As will be described in greater detail below, the analysis performed at operation 106 and procedures for improving the operation of the search engine performed at operation 108 might include utilizing data collected at operation 104 for document summarization and keyword expansion, utilizing the collected data to analyze the findability of web pages to measure search engine accuracy, and utilizing the collected data to identify and implement query alterations at the search engine.

According to other embodiments, the data collected at operation 106 may be utilized to provide metadata for the pages, utilized to identify ranking issues with the pages, utilized to perform a form of eye-tracking on the pages, utilized to perform a cognitive analysis that identifies players' searching behavior, and utilized to identify query structure. As mentioned above, other data collected during game play, such as demographic data, might also be analyzed and utilized to improve the performance of the search engine. Additional details regarding these various processes for analyzing the data collected through the human computation games described herein and utilizing the results of such an analysis to improve performance of a search engine will be described in greater detail below with respect to FIG. 7.

Figure 2:
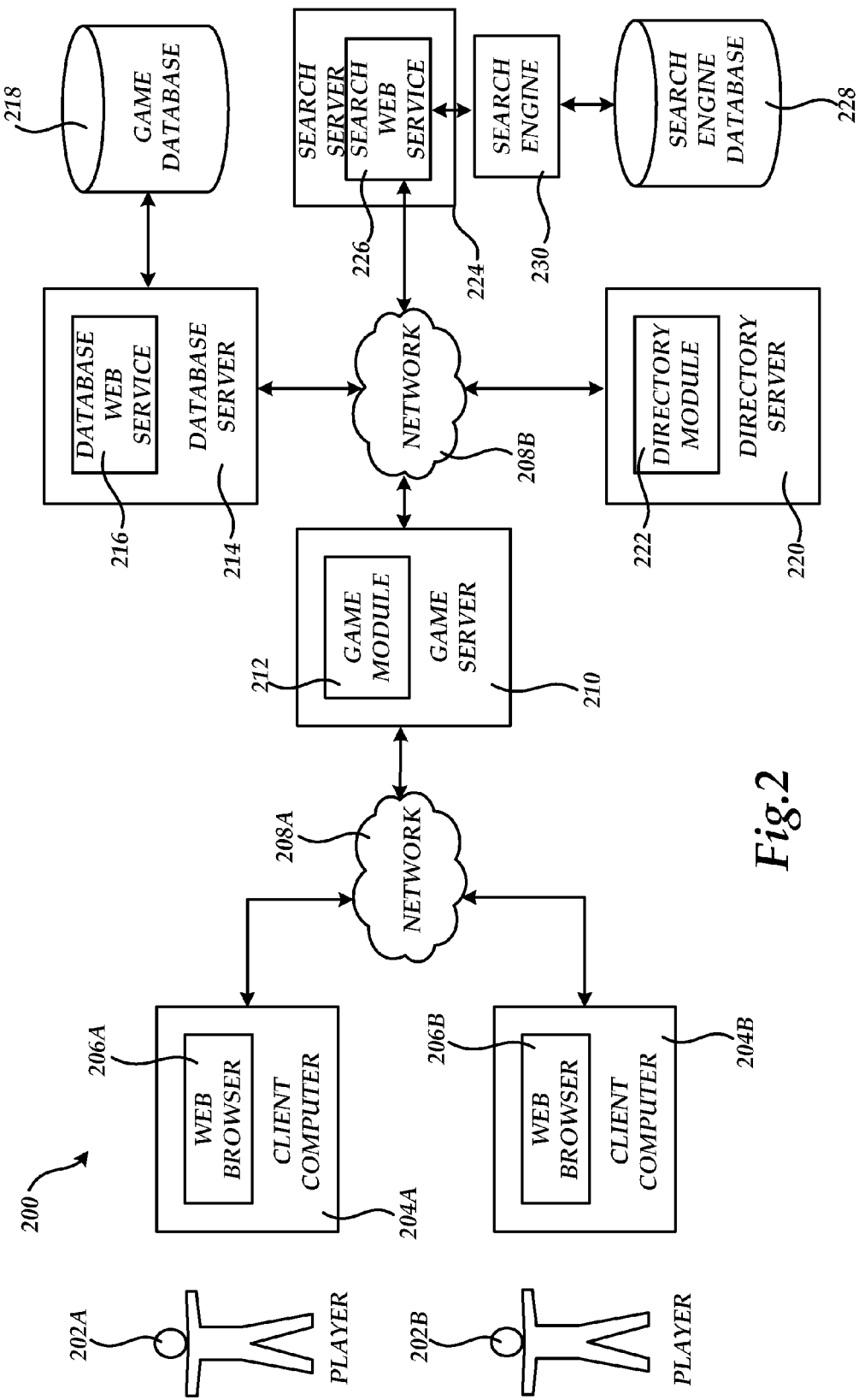
FIG. 2 is a system and network diagram showing an illustrative operating environment for several software components presented herein in embodiments.

Turning now to FIG. 2, a system and network diagram showing an illustrative operating environment for several software components presented herein will be described. It should be appreciated that the system 200 illustrated in FIG. 2 has been simplified for discussion purposes. In particular, it should be appreciated that may more or fewer software components may be utilized to embody the aspects presented herein. Similarly, more or fewer computer systems may be utilized to embody the aspects presented herein. Additionally, more or fewer network connections between the computers and software components described herein may also be utilized. Moreover, while two players 202A-202B are illustrated in FIG. 2, it should be appreciated that more than two players may utilize the human computation games in various embodiments presented herein.

As shown in FIG. 2, several networks 208A-208B interconnect several client computers 204A-204B, a game server 210, a database server 214, a search server 224, and a directory server 220. The networks 208A-208B provide a mechanism for enabling data communication between these computers. According to one implementation, the game server 210 is configured to execute a game module 212. As will be described in greater detail below, the game module 212 operates in conjunction with a search web service 226 executing on the search server 224. The search web service 226 provides a web interface to the search engine 230.

Data collected by the game module 212 is stored in a game database 218 accessible through a database web service 216 provided by the database server 214. As described briefly above, results of game play provided by the game module 212 can be utilized in the manner presented herein to improve the performance of the search engine 230. In this regard, the search engine 230 maintains a search engine database 228. The search engine database 228 may include an index of documents for use by the search engine 230 when performing search queries. The documents identified in the index may be stored on the web or another type of computer network. It should be appreciated that the configuration of the search engine 230 has been simplified for discussion purposes and that the search engine 230 may include additional components not shown in FIG. 2.

According to one implementation, players 202A-202B can utilize web browser application programs 206A-206B executing on the client computers 204A-204B to access the functionality provided by the game module 212. It should be appreciated that other software components not illustrated in FIG. 2 may execute on the client computer 204A in conjunction with the execution of the web browser 206 to provide the game experience described herein. For instance, various scripting technologies, plug-ins, and other components designed to execute in conjunction with the operation of the web browser 206 and the game module 212 may be utilized on the client computer 204 to provide the game experience described herein. It should also be appreciated that while the embodiments presented herein have been described in the context of a web browser executing on a client computer, the functionality presented herein might be implemented in a stand-alone application program capable of executing on the client computers 204A-204B. Other implementations might also become apparent to those skilled in the art.

As discussed briefly above, the game module 212 is configured to provide one or more human computation games. The players 202A-202B may play these games through the use of an interface provided via the web browsers 206A-206B (or an equivalent stand-alone application) and the game module 212. According to implementations, the game module 212 is configured to store data in the game database 218 identifying the pages that should be utilized during game play. As discussed above, the particular pages that should be utilized during game play may be selected utilizing one or more methodologies. Alternatively, the pages for use in game play may be selected at random.

When game play begins, the game module 212 is configured to cause one of the web pages to be displayed to one or more of the players 202A-202B. The player, or players, is then asked to provide one or more terms that are likely to cause the search engine 230 to return the displayed page in response to performing a query using the terms. The terms provided by the players 202A-202B during game play are collected by the game module 212 and stored in the game database 218. Subsequent to game play, the pages and the associated terms provided by the players 202A-202B during game play may be utilized to analyze the performance of the search engine 230. As discussed briefly above, the results of this analysis may then be utilized to improve the performance of the search engine 230. Additional details regarding the operation of the game module 212 in this regard will be provided below with respect to FIG. 3-6.

According to implementations, the game module 212 may allow the players 202A-202B to play the human computation games described herein anonymously. Alternately, the game module 212 may allow the players 202A-202B to create a login for use in storing data related to progress, high scores, preferences, and the like. In this regard, the game module 212 may utilize the services of a directory module 222 to maintain a database of player information. In one embodiment, certain information might be displayed to a player upon login including, but not limited to, a history of their scores, their best session score, their overall score, and other information.

As described briefly above, one of the human computation games presented herein is a single player game. FIG. 3, shows a user interface diagram showing aspects of a user interface 300 generated by the game module 212 and the web browser 206 during game play of such a game. As shown in FIG. 3, the user interface 300 includes user interface controls 302A-302C, for starting a new game, obtaining help regarding game play, or logging out from the game, respectively. The user interface 300 also includes a display of a web page 304. As known in the art, a web page 304 can be displayed by a web browser 206 through a rendering process that renders text, graphics, and linked content. Although the screen display illustrated in FIG. 3 has been simplified for discussion purposes, it should be appreciated that the web page 304 shown in FIG. 3 might include each of these elements and others, such as multimedia, animation, sounds, and other types of page elements.

According to one implementation, the user interface 300 shown in FIG. 3 also includes a user interface window 306 through which a player can interact with the human computation game. The window 306 includes a header portion 308 indicating an elapsed time for the current game, a player's current score, and an indicator showing the number of correct responses provided by the player. The window 306 also includes an input panel 310 through which the player can input one or more terms 312. As discussed briefly above, the player is asked to provide terms 312 that are likely to cause the search engine 230 to return the displayed web page 304 in response to performing a query using the provided terms 312. According to one implementation, the window 306 is displayed partially transparently over the web page 304 so that a user may still be able to view the portion of the web page 304 immediately underneath the window 306.

In one implementation, user interface controls 302D-302E are also provided which allow a player to skip a web page 304 or report a web page 304 as being a "bad" page, respectively. A bad page may be a page that includes inappropriate subject matter, has not rendered correctly, or includes other defects.

As shown in FIG. 3, the window 306 also includes a results list 314. The results list 314 identifies the results returned by the search engine 230 in response to performing a search query using the terms 312 provided by the player. For each page identified in the results list 314, the page title, description, and a uniform resource locator ("URL") for the page may be provided. Additionally, an indicator may be provided for each of the results shown in the results list 314 indicating whether the result corresponding to the web page 304. For instance, in the implementation shown in FIG. 3, a checkmark has been placed next to the first result in the results list 314 indicating that this result matches the web page 304.

According to implementations, a player is assigned points when the web page 304 appears in the search results returned by the search engine 230 in response to performing a query using the terms 312. In one implementation, points are only assigned to a player when the web page 304 appears in the top N search results returned by the search engine 230. N may be any pre-defined integer value.

As will be described in greater detail below, once a player has provided terms 312 that cause the search engine 230 to return results that include the web page 304, points are assigned to the player and a new web page 304 is identified by the game module 212 and displayed in the web browser 206. In this manner, a player can continue to play the game until a predefined period of time elapses. Alternatively, a player may specify the time period or specify a number of web pages 304 that should be included in a particular game. A player may play any number of games. Additional details regarding the operation of the single player human computation game illustrated in FIG. 3 will be provided below with respect to FIG. 4. It should be appreciated that user interface shown in FIG. 3 is merely illustrative and that other types of user interfaces may be utilized to embody the aspects disclosed herein.

Figure 4:
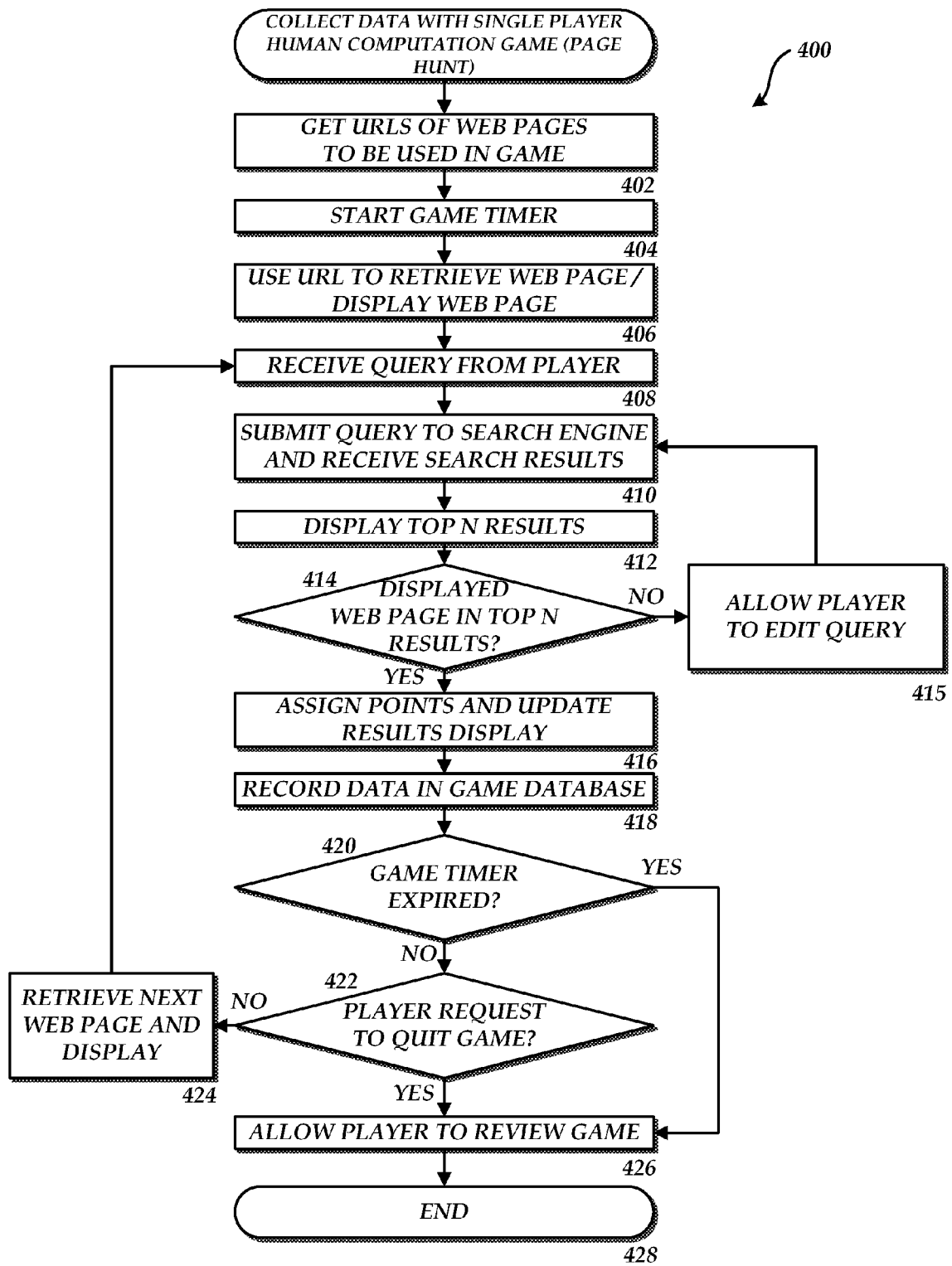
FIGS. 4-6 are flow diagrams illustrating various human computation games presented herein according to embodiments.

Referring now to FIG. 4, additional details will be provided regarding the embodiments presented herein for utilizing human computation games to improve search engine performance. In particular, FIG. 4 is a flow diagram showing a routine 400 that illustrates aspects of a single player human computation game disclosed herein. Aspects of the game can be implemented by the game module 212, software components executing within the web browser 206, and in conjunction with the other software components and computer systems shown in FIG. 2 and described above. Additional details in this regard will be provided below.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the game module 212 retrieves URLs or other identifiers for the pages to be utilized in the game from the game database 218. Once the identifiers have been retrieved, the routine 400 proceeds to operation 404 where a timer for use in timing the current game is started. As discussed above, the duration of a game may be specified in advance and enforced using such a timer.

From operation 404, the routine 400 proceeds to operation 406 where the web browser 206 utilizes the URL of the first page to retrieve and render the page. In this manner, the page is displayed to a player 202 of the game. In other embodiments, a rendering of the web page may be stored as an image and the stored image may be shown. Additionally, the other user interface items shown in FIG. 3 and described above, such as the window 306, may be rendered for display to the player 202.

From operation 406, the routine 400 proceeds to operation 408 where the terms 312 are received from the player 202. In response to receiving the terms 312, the routine 400 proceeds to operation 410 where the game module 212 submits the terms 312 to the search web service 226. In response thereto, the search web service 226 causes the search engine 230 performs a query utilizing the terms 312 and the search web service 226 returns the search results. As discussed above, the search results are displayed in the results list 314. In one embodiment, only the top N results are displayed. This occurs at operation 412.

It should be appreciated that, according to embodiments, the terms 312 might be modified prior to submitting the terms 312 to the search engine 230. For example, if a player types the terms "dog+park", these terms might be modified to "dog park." Similarly, if a player types the terms "dog park Seattle", the terms might be modified to "Seattle dog park." As another example, if a player types the terms "dog park seattletimes.com", this query might be modified to "dog park site:seattletimes.com." Alternatively, if a player typed the terms "dog park site:seattletimes.com", the "site:" tag might be removed. It should be appreciated, therefore, that the terms 312 provided by the players might be modified in embodiments prior to sending the terms to the search engine 230. In this regard, it should also be appreciated that performing a query using the terms 312 as described herein encompasses performing a query using modifications of the terms 312.

From operation 412, the routine 400 proceeds to operation 414, where a determination is made as to whether the displayed page 304 is in the top N results returned by the search engine 230. If the web page 304 is not in the top N results, the routine 400 proceeds to operation 415 where the player is permitted to edit the terms 312. From operation 415, the routine 400 proceeds to operation 410, discussed above.

If, at operation 414, it is determined that the web page 304 is identified in the top N search results returned by the search engine 230, the routine 400 proceeds from operation 414 to operation 416. At operation 416, points are assigned to the player. In one embodiment, points may be assigned to the player based upon the rank of the web page 304 in the search results. For instance, 100 points may be assigned to the player if the web page 304 is in position one in the search results, 90 points may be assigned to the player if the web page 304 is position two of the search results, and so on. Additionally, a greater number of points may be provided to the player if the player avoids the use of frequently used search terms. In some embodiments, a point bonus may be provided randomly to the player in order to increase the player's interest in the game. Once the points have been assigned, the contents of the window 306 are updated to reflect the player's current score.

From operation 416, the routine 400 proceeds to operation 418 where the terms 312 provided by the player are stored in the game database 218. The terms provided by the player are associated with the identifier for the web page 304. In this manner, a record of the terms 312 provided by the player 202 is created. As discussed briefly above, other data associated with the terms 312 might also be recorded and stored in the game database 218. For instance, at operation 418, the game module 212 might also record the player's screen name if the player has not logged on anonymously, the identifier for the web page 304, the terms 312 provided by the user, data indicating whether the terms were correct and, if so, the ranked position of the web page 304 in the search results, the time, and the points the player was assigned for the particular query terms 312. Other associated data, such as demographic information, might also be stored. As will be discussed in greater detail below with respect to FIG. 7, this data might be utilized to analyze the performance of the search engine 230 and to improve its performance.

From operation 418, the routine 400 proceeds to operation 420, where a determination is made as to whether the game timer has expired. If the game timer has expired, the routine 400 proceeds from operation 420 to operation 426. If the game timer has not expired, the routine 400 proceeds from operation 420 to operation 422. At operation 422, a determination is made as to whether a player has requested to quit the current game. If not, the routine 400 proceeds to operation 422 where the next web page 304 is retrieved and displayed in the user interface 300. From operation 424, the routine 400 proceeds to operation 408, described above. In this manner, a player can continue to play the game by viewing web pages and providing terms likely to cause a search engine to return the page in search results. It should be appreciated that, in one embodiment, the game timer runs as a separate process and can interrupt game play at the time of its expiration. In this manner, the game timer can be utilized to end game play at any time even if a user has not yet typed in a query. Other mechanisms may also be utilized to impose a time limit on game play.

If a player requests to quit the game or whenever the game timer expires, the routine 400 proceeds from operation 422 to operation 426. At operation 426, a player may be permitted to review the game, including seeing the web pages 304 displayed, their URLs, the correct and incorrect terms provided with associated result sets, the number of points earned, and other statistics regarding game play. Once the player has completed reviewing their game, the routine 400 proceeds from operation 426 to operation 428, where it ends.

As discussed briefly above, the embodiments presented herein also provide several multi-player human computation games. FIG. 5 is a flow diagram showing a routine 500 that illustrates the operation of one such multi-player game. In particular, the routine 500 illustrates the operation of a multi-player game wherein a page is simultaneously displayed to multi-players 202A-202B and wherein points are assigned to the first of the players 202A-202B that provides terms 312 which, when utilized by the search engine 230, return search results that include the displayed web page 304 in the top N results. The routine 500 illustrates the operations performed in order to provide such a game in greater detail.

The routine 500 begins at operation 502 where the game module 212 matches players 202A-202B. In one implementation, pre-recorded game sessions can be utilized in place of an actual player when there are an odd number of human players. Other mechanisms may also be utilize to simulate the play of a human player when an even number of players is not available.

Once the players have been matched (or an appropriate mechanism has been identified for simulating the play of a human player), the routine 500 proceeds to operation 504 where the URLs or other types of identifiers for the pages to be utilized in the game are retrieved from the game database 218. Once the identifiers have been retrieved, the routine 500 proceeds from operation 504 to operation 505, where the same web page is displayed to the players 202A-202B via the respective web browsers 206A-206B. In this regard, a user interface similar to that shown in FIG. 3 and described above may be provided to each of the players 202A-202B.

From operation 505, the routine 500 proceeds to operation 506, where the terms 312 provided by each of the players 202A-202B are received via the window 306. The routine 500 then proceeds to operation 508 where the terms 312 are submitted to the search engine 230 via the search web service 226. As discussed above, the search engine 230 utilizes the terms 312 to perform a search and returns the search results to the web browsers 206A-206B via the search web service 226. In response to receiving the results, both the queries 312 and their top N results are displayed for both players 202A-202B in their respective panels 306.

From operation 510, the routine 500 proceeds to operation 512 where a determination is made as to whether the displayed web page 304 is included in the top N search results for either of the players 202A-202B. If not, each player is permitted to edit their terms 312 at operation 514. If, however, the web page 304 is contained in the top N search results for one of the players 202A-202B, the routine 500 proceeds to operation 516.

At operation 516, the game module 212 assigns points to the player that submitted the terms 312 that were included in the top N search results. The routine 500 then proceeds to operation 518 where the data regarding the game is recorded in the game database 218. As discussed above, the data recorded in the game database 218 might include each player's screen name, the identifier for the displayed page 304, the terms 312 that were submitted by each of the players, whether the terms generated a correct response and, if so, the rank position, the time, and the points the player received for providing the terms 312. Other data may also be recorded in the game database 218.

From operation 518, the routine 500 proceeds to operation 520 where a determination is made as to whether the game timer has expired or if one of the players 202A-202B has requested to quit the game. If not, the next web page 304 is retrieved and displayed by the web browsers 206A-206B. From operation 522, the routine 500 returns to operation 506, discussed above. If either of the players 202A-202B have requested to quit the game, the routine 500 proceeds from operation 520 to operation 524, where it ends.

It should be appreciated that the various options described above with respect to the single player game may also be utilized in conjunction with the multi-player game described with reference to FIG. 5. For instance, a timer may be utilized, a leaderboard may be provided showing top scoring players, additional players may be awarded for the use of infrequent terms 312, and random point bonuses may be provided. Other options may be apparent to those skilled in the art.

FIG. 6 shows an illustrative routine 600 that illustrates aspects of another human multi-player human computation game disclosed herein. In the game illustrated by the process 600, the same or related pages 304 are displayed to two players. Terms 312 are received from the players, the search engine 230 performs queries using the terms, and search results are received from the search engine 230. The results are then displayed to the players 202A-202B. Each of the players 202A-202B is then queried as to whether they believe they are viewing the same or a different page 304 as the other player. Points are assigned to both players 202A-202B when both players correctly indicate that they are viewing the same or a different page 304 as the other player. The routine 600 shown in FIG. 6 illustrates additional aspects regarding the operation of such a multi-player human computation game.

The routine 600 begins at operation 602 where the game module 212 matches the players 202A-202B or identifies an appropriate mechanism for simulating the play of a human player. Once the players have been matched, the routine 600 proceeds to operation 604 where the identifiers for the pages 304 to be utilized in the game are retrieved from the game database 218. From operation 604, the routine 600 proceeds to operation 606 where the same or a related web page 304 is displayed to the players 202A-202B by the web browsers 206A-206B, respectively.

From operation 606, the routine 600 proceeds to operation 608, where terms 312 are received from each of the players 202A-202B through the use of an appropriate user interface. At operation 610, the terms 312 are submitted to the search engine 230 and search results are received in response thereto.

From operation 610, the routine 600 proceeds to operation 612, where the top N search results for each of the players 202A-202B are displayed to both of the players 202A-202B. An appropriate user interface may be provided within the web browser 206A-206B for displaying the search results.

From operation 612, the routine 600 proceeds to operation 614, where each of the players 202A-202B is queried as to whether the displayed web page 304 is the same as the web page shown to the other player. In this manner, each player is asked to make a guess as to whether the other player is being shown the same or a different web page.

From operation 614, the routine 600 proceeds to operation 616 where a determination is made as to whether both players agree and correctly indicate that they are viewing the same or a different page as the other player. If not, the routine 600 proceeds to operation 626 where the next web page 304 is identified and displayed to the players 202A-202B. If both players are correct, the routine 600 proceeds to operation 620, where points are assigned to both of the players 202A-202B. The routine 600 then proceeds to operation 622, where the data identified above is recorded by the game module 212 in the game database 218.

From operation 622, the routine 600 proceeds to operation 624, where the game module 212 determines whether the game timer expires or if either of the players 202A-202B have requested to quit the game. If not, the routine 600 proceeds to operation 626 where the next web page 304 is identified and displayed to the players 202A-202B. If either of players 202A-202B have requested to quit the game, the routine 600 proceeds to operation 628, where it ends.

As discussed above, the various options presented with respect to the single player game may also be utilized in conjunction with the multi-player game illustrated in FIG. 6. For instance, a timer, a leaderboard, and random points, may be utilized with respect to the multi-player game shown in FIG. 6 and described above.

Figure 7:
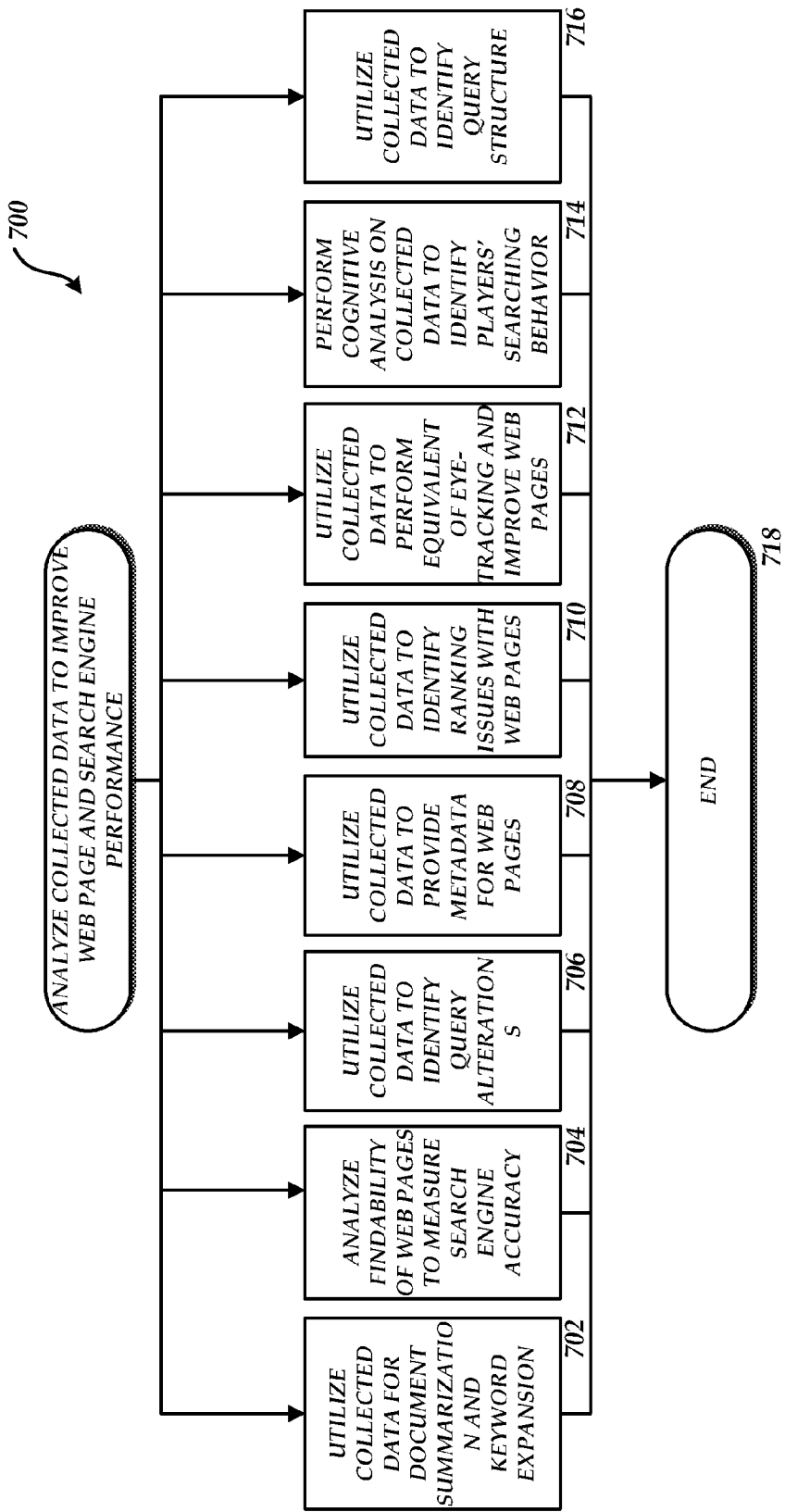
FIG. 7 is a flow diagram showing aspects of various processes presented herein for analyzing and improving the performance of a search engine utilizing data collected using human computation games in one embodiment presented herein.

Referring now to FIG. 7, an illustrative routine 700 will be described that illustrates various processes for analyzing the data collected utilizing the human computation games described above to improve web page and search engine performance. It should be appreciated that the operations 702-716 may be performed independently of one another, or in conjunction with one another, in order to improve various aspects of the search engine 230 or one or more pages.

At operation 702, the data collected during play of the human computation games described above and stored in the game database 218 can be utilized for document summarization and keyword expansion. In particular, the terms 312 elicited from the players 202A-202B during game play for each page can be treated as a succinct description of the page. Accordingly, this data can be used to summarize each of the pages and to identify keywords associated with the pages. This data may be utilized by the search engine 230 in an appropriate fashion, such as when building the index stored in the search engine database 228.

At operation 704, the data collected during play of the human computation games described above is analyzed to determine the "findability" of web pages and to measure the accuracy of the search engine 230 as compared to other search engine modules. As used herein, the term "findability" refers to the ease in which a particular page may be found utilizing particular terms. If a URL has a 100 percent findability level, this indicates that the page can be easily located since every successful term in the collected data related to the URL brought this URL into the top N search results. On the other hand, if a page has a zero percent findability level, then this indicates that no query terms in the data successfully brought up this page in the top N search results.

Findability can be expressed as a function of URL length. From such an analysis, it may be possible to conclude that as the length of the URL links increases, the URLs are harder to locate through the search engine 230. Findability may also be computed as a function of the number of slash characters within the URL for each page. The findability metric can be used to evaluate the overall and comparative performance the search engine 230.

At operation 706, the data collected during game play and stored in the game database 218 is utilized to identify query alterations. Query alterations refer to a process performed by the search engine 230 at query time during which queries are modified to also perform a search for synonyms or other related terms. On most search engines, for example, a search for "Wash. DC" will be modified internally to search for "Wash. D.C." ORed with "Washington, D.C.". Query alterations that are used by a search engine may be obtained using a variety of sources. According to this embodiment presented herein, the query alterations are obtained from the data collected during the game play described above and stored in the game database 218.

According to one embodiment bitext matching is utilized to identify query alterations. For instance, through this mechanism, spelling or punctuation alterations may be identified, sitename to site alterations may be identified, acronym expansion alterations may be identified, and conceptual alterations may be identified. One mechanism for bitext matching is described in U.S. Pat. No. 7,412,385 entitled "System for Identifying Paraphrases Using Machine Translations", which is assigned to the assignee of the instant patent application and incorporated by reference herein in its entirety.

At operation 708, the data collected during game play and stored in the game database 218 is utilized to provide metadata for the web pages presented during game play. This metadata may be associated with the appropriate web page and utilized by the search engine 230 during its indexing process. In addition, the metadata for a particular page utilized in the human computation games described herein may be generalized to other pages not utilized during game play to improve the performance of the search engine 230 with respect to these pages.

At operation 710, the collected data can be utilized to identify ranking issues with pages. For example, analysis of the data may show that the search engine does not rank the right results, and hence performance suffers whenever, say, the queries are long queries (4 or more words, say), or if they contain names, or special punctuation symbols etc. Moreover, as discussed briefly above, in one embodiment the pages selected for use in the analysis described herein are pages that do not show up in search results provided by the search engine 230. By using pages that do not show up in search results the games presented herein can be utilized to identify queries that lead to these pages. The identified queries can then be utilized at operation 710 to determine why the pages do not show up in search results.

At operation 712, the data collected during game play and stored in the game database 218 is utilized to perform the equivalent of an eye-tracking analysis without the need for eye-tracking hardware and software. Eye-tracking refers to a process by which the portion of a displayed page upon which a user's eye is focused is identified. Through an analysis of the data collected through eye-tracking, the particular page elements upon which user's primarily focus may be identified. Moreover, the layout of a page may be modified in view of the results of such eye-tracking.

The data collected during game play and stored in the game database 218 may be utilized in order to identify the portions of the page 304 upon which a user's eye focused. For instance, terms collected during game play and stored in the game database 218 may be compared in time order to terms present on the web page 304 in order to determine the order in which the player viewed the various terms. This analysis can be utilized to optimize the layout of elements on the page 304. The results of this analysis can also be utilized to improve ranking performed by the search engine 230.

At operation 714, a cognitive analysis is performed on the data collected during game play and stored in the game database 218 to identify the searching behavior of the game players. For instance, through such an analysis the manner in which players construct queries over a period of time may be identified.

At operation 716, the data collected during game play and stored in the game database 218 is analyzed to identify query structure. For instance, the collected data may be analyzed to identify the syntax most often utilized by players to search for weather. As an example, it might be determined that a certain percentage of players may query for weather using the terms "weather, city name". In response to such a determination, the search engine 230 may provide particular results for the identified city in response to receiving such a query. Other operations may also be performed by the search engine 230 once a particular common syntax for various queries has been identified. The routine 700 ends at operation 718.

FIG. 8 shows an illustrative computer architecture for a computer 800 capable of executing the software components described herein for utilizing human computation games to improve search engine performance in the manner presented above. The computer architecture shown in FIG. 8 illustrates a conventional desktop, laptop, or server computer and may be utilized to execute any aspects of the software components presented herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the game module 212 and the game database 218, each of which was described in detail above with respect to FIGS. 1-7. In one implementation, the SILVERLIGHT web browser plug-in from MICROSOFT corporation is utilized to implement aspects of the game within the Web browsers 206A-206B. It should be appreciate that other client-side environments may be utilized. Moreover, as discussed above, the various aspects presented herein may be implemented in a stand-alone client application or in another manner. The mass storage device 810 and the RAM 814 may also store other types of program modules and data.

It should be appreciated that the software components described herein may, when loaded into the CPU 802 and executed, transform the CPU 802 and the overall computer 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for utilizing human computation games to improve search engine performance are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for using a human computation game to improve search engine performance, the computer-implemented method comprising performing computer-implemented operations for:
    displaying a page to two or more players via a multi-player game;
    upon displaying the page,
        receiving first terms from a first player and receiving second terms from a second player,
        causing a search engine to return first candidate pages in response to performing a first query using the first terms,
        causing the search engine to return second candidate pages in response to performing a second query using the second terms,
        assigning points to the first player if the first candidate pages returned by the search engine include the page displayed before the second candidate pages returned by the search engine include the page displayed, and
        assigning the points to the second player if the second candidate pages returned by the search engine include the page displayed before the first candidate pages returned by the search engine include the page displayed;
    storing one or more of the first terms and the second terms provided by the two or more players during play of the multi-player game and associated data; and utilizing the one or more of the first terms and the second terms and the associated data to improve results returned by the search engine.

2. The computer-implemented method of claim 1, further comprising:
displaying a second page via a single-player game;
upon displaying the second page,
receiving one or more terms from a player via the single-player game,
causing the search engine to return the candidate pages in response to performing a query using the terms, and
assigning second points to the player if the second page displayed to the player is included in the candidate pages returned by the search engine;
storing the terms provided by the player during play of the single-player game and associated second data; and
utilizing the terms and the associated second data to improve results returned by the search engine.

3. The computer-implemented method of claim 1, further comprising:
displaying a third page to the two or more players via a second multi-player game;
upon displaying the third page,
receiving third terms from the first player and receiving fourth terms from the second player,
causing the search engine to return third candidate pages in response to performing a third query using the third terms,
causing the search engine to return fourth candidate pages in response to performing a fourth query using the fourth terms, and
assigning third points to the first player and the second player when the first player and the second player agree and correctly indicate that they are viewing the same or a different page as the other player;
storing one or more of the third terms and the fourth terms provided by the two or more players during play of the second multi-player game and associated third data; and
utilizing the one or more of the third terms and the fourth terms and the associated third data to improve results returned by the search engine.

4. The computer-implemented method of claim 1, wherein utilizing the one or more of the first terms and the second terms to improve results returned by the search engine comprises utilizing the one or more of the first terms and the second terms to identify query alterations for use by the search engine.

5. The computer-implemented method of claim 1, wherein utilizing the one or more of the first terms and the second terms to improve results returned by the search engine comprises utilizing the one or more of the first terms and the second terms to provide metadata for the page.

6. The computer-implemented method of claim 1, wherein utilizing the one or more of the first terms and the second terms to improve results returned by the search engine comprises utilizing the one or more of the first terms and the second terms to identify query structure.

7. The computer-implemented method of claim 1, wherein utilizing the one or more of the first terms and the second terms to improve results returned by the search engine comprises performing a cognitive analysis on the one or more of the first terms and the second terms to identify searching behavior.

8. The computer-implemented method of claim 1, wherein utilizing the one or more of the first terms and the second terms to improve results returned by the search engine comprises utilizing the one or more of the first terms and the second terms determine where on the page the first player's or the second player's eyes are focused when providing the one or more of the first terms and the second terms.

9. The computer-implemented method of claim 1, wherein utilizing the one or more of the first terms and the second terms to improve results returned by the search engine comprises utilizing the one or more of the first terms and the second terms to identify a ranking issue with the page.

10. A computer-readable storage medium having computer-readable instructions stored thereupon which, when executed by a computer, cause the computer to:
display a page to two or more players via a multi-player game;
when the page is displayed,
receive first terms from a first player and receiving second terms from a second player,
cause a search engine to return first candidate pages in response to performing a first query using the first terms,
cause the search engine to return second candidate pages in response to performing a second query using the second terms, and
assign points to the first player and the second player when the first player and the second player agree and correctly indicate that they are viewing the same or a different page as the other player;
store one or more of the first terms and the second terms provided by the two or more players during play of the multi-player game and associated data; and
utilize the one or more of the first terms and the second terms and the associated data to improve results returned by the search engine.

11. The computer-readable storage medium of claim 10, having further computer-readable instructions stored thereupon which, when executed by the computer, cause the computer to:
display a second page via a single-player game;
when the second page is displayed,
receive one or more terms from a player via the single-player game,
cause the search engine to return the candidate pages in response to performing a query using the terms, and
assign second points to the player if the second page displayed to the player is included in the candidate pages returned by the search engine;
store the terms provided by the player during play of the single-player game and associated second data; and
utilize the terms and the associated second data to improve results returned by the search engine.

12. The computer-readable storage medium of claim 10, having further computer-readable instructions stored thereupon which, when executed by the computer, cause the computer to:
display a third page to the two or more players via a second multi-player game;
when the third page is displayed,
receive third terms from the first player and receiving fourth terms from the second player,
cause the search engine to return third candidate pages in response to performing a third query using the third terms,
cause the search engine to return fourth candidate pages in response to performing a fourth query using the fourth terms,
assign points to the first player if the third candidate pages returned by the search engine include the third page displayed before the fourth candidate pages returned by the search engine include the third page displayed, and assign the points to the second player if the fourth candidate pages returned by the search engine include the third page displayed before the third candidate pages returned by the search engine include the third page displayed;

store one or more of the third terms and the fourth terms provided by the two or more players during play of the second multi-player game and associated third data; and utilizing the one or more of the third terms and the fourth terms and the associated third data to improve results returned by the search engine.

13. The computer-readable storage medium of claim 10, wherein to utilize the one or more of the first terms and the second terms to improve results returned by the search engine, the computer-readable instructions further cause the computer to utilize the one or more of the first terms and the second terms to identify query alterations for use by the search engine.

14. The computer-readable storage medium of claim 10, wherein to utilize the one or more of the first terms and the second terms to improve results returned by the search engine, the computer-readable instructions further cause the computer to utilize the one or more of the first terms and the second terms to provide metadata for the page.

15. The computer-readable storage medium of claim 10, wherein to utilize the one or more of the first terms and the second terms to improve results returned by the search engine, the computer-readable instructions further cause the computer to utilize the one or more of the first terms and the second terms to identify query structure.

16. The computer-readable storage medium of claim 10, wherein to utilize the one or more of the first terms and the second terms to improve results returned by the search engine, the computer-readable instructions further cause the computer to perform a cognitive analysis on the one or more of the first terms and the second terms to identify searching behavior.

17. The computer-readable storage medium of claim 10, wherein to utilize the one or more of the first terms and the second terms to improve results returned by the search engine, the computer-readable instructions further cause the computer to utilize the one or more of the first terms and the second terms determine where on the page the first player's or the second player's eyes are focused when providing the one or more of the first terms and the second terms.

18. The computer-readable storage medium of claim 10, wherein to utilize the one or more of the first terms and the second terms to improve results returned by the search engine, the computer-readable instructions further cause the computer to utilize the one or more of the first terms and the second terms to identify a ranking issue with the page.

19. A computer-implemented method for using a human computation game to improve search engine performance, the computer-implemented method comprising performing computer-implemented operations for:

displaying a page to two or more players via a multi-player game;

upon displaying the page,
receiving first terms from a first player and receiving second terms from a second player,
causing a search engine to return first candidate pages in response to performing a first query using the first terms,
causing the search engine to return second candidate pages in response to performing a second query using the second terms, and
assigning points to the first player and the second player when the first player and the second player agree and correctly indicate that they are viewing the same or a different page as the other player;

storing one or more of the first terms and the second terms provided by the two or more players during play of the multi-player game and associated data; and utilizing the one or more of the first terms and the second terms and the associated data to improve results returned by the search engine.

20. The computer-implemented method of claim 19, further comprising:

displaying a second page via a single-player game;

upon displaying the second page,
receiving one or more terms from a player via the single-player game,
causing the search engine to return the candidate pages in response to performing a query using the terms, and
assigning second points to the player if the second page displayed to the player is included in the candidate pages returned by the search engine;

storing the terms provided by the player during play of the single-player game and associated second data; and utilizing the terms and the associated second data to improve results returned by the search engine.

\* \* \* \* \*